(12) United States Patent
Mochizuka

(10) Patent No.: US 9,690,163 B2
(45) Date of Patent: Jun. 27, 2017

(54) REFLECTANCE VARIABLE ELEMENT AND METHOD FOR MANUFACTURING SAME

(71) Applicant: MURAKAMI CORPORATION, Shizuoka (JP)

(72) Inventor: Takuo Mochizuka, Shizuoka (JP)

(73) Assignee: MURAKAMI CORPORATION, Shizuoka (JP)

( * ) Notice: Subject to any disclaimer, the term of this patent is extended or adjusted under 35 U.S.C. 154(b) by 0 days.

(21) Appl. No.: 15/103,992

(22) PCT Filed: Dec. 4, 2014

(86) PCT No.: PCT/JP2014/082085
§ 371 (c)(1),
(2) Date: Jun. 13, 2016

(87) PCT Pub. No.: WO2015/093298
PCT Pub. Date: Jun. 25, 2015

(65) Prior Publication Data
US 2016/0313626 A1    Oct. 27, 2016

(30) Foreign Application Priority Data
Dec. 19, 2013 (JP) .................................. 2013-263071

(51) Int. Cl.
*G02F 1/15* (2006.01)
*G02F 1/19* (2006.01)
(Continued)

(52) U.S. Cl.
CPC .............. *G02F 1/19* (2013.01); *G02F 1/1506* (2013.01); *G03G 17/02* (2013.01); *G02F 1/153* (2013.01); *G02F 2203/02* (2013.01)

(58) Field of Classification Search
CPC ........ G02F 1/01; G02F 1/1506; G02F 1/1508; G02F 1/1521; G02F 1/153; G02F 1/155;
(Continued)

(56) References Cited

U.S. PATENT DOCUMENTS 3,439,174 A * 4/1969 Snaper .................. G02F 1/1506
205/53
5,080,470 A * 1/1992 Warszawski ............ G02F 1/161
359/265
(Continued)

FOREIGN PATENT DOCUMENTS

JP        09-297324       11/1997
JP        10-133236       5/1998
(Continued)

OTHER PUBLICATIONS

"Electrochemical Optical-Modulation Device with Reversible Transformation Between Transparent, Minor, and Black", Advanced Materials, Jun. 19, 2012, pp. OP122-OP126, vol. 24, Issue 23.
(Continued)

*Primary Examiner* — Loha Ben
(74) *Attorney, Agent, or Firm* — Greenblum & Bernstein, P.L.C.

(57) ABSTRACT

This invention enables obtainment of a reflectance variable element having a high cold tolerance. Two transparent substrates are disposed so as to face each other across a gap. On respective surfaces of the transparent substrates, the surfaces facing each other, respective transparent conductive films are formed. An electrolytic solution is charged in the gap. The electrolytic solution has a composition in which at least silver ions and copper ions, a content by weight of the copper ions being smaller than that of the silver ions, are contained in a non-aqueous solvent containing a non-aqueous solvent having a boiling point that is higher than that of
(Continued)

methanol and methanol, a content by weight of the methanol being smaller than that of the non-aqueous solvent.

10 Claims, 5 Drawing Sheets

(51) Int. Cl.
*G03G 17/02* (2006.01)
*G02F 1/153* (2006.01)

(58) Field of Classification Search
CPC .... G02F 1/161; G02F 1/163; G02F 2201/121; G02F 2203/02; G03G 17/02; B82Y 20/00; G02B 26/00
USPC ........ 359/245, 254, 290, 295, 297; 345/105; 250/214 LA; 205/53, 338, 630; 347/166, 347/224
See application file for complete search history.

(56) References Cited

U.S. PATENT DOCUMENTS

| | | | |
|---|---|---|---|
| 5,082,355 A * | 1/1992 | Warszawski | G02F 1/153 359/265 |
| 5,207,877 A * | 5/1993 | Weinberg | B01D 53/326 205/696 |
| 5,864,420 A | 1/1999 | Udaka et al. | |
| 5,903,382 A * | 5/1999 | Tench | G02F 1/1506 359/265 |
| 5,923,456 A * | 7/1999 | Tench | G02F 1/1506 359/265 |
| 6,045,725 A | 4/2000 | Udaka et al. | |
| 6,631,022 B1 | 10/2003 | Kihira et al. | |
| 7,538,933 B2 * | 5/2009 | Nakayama | B82Y 20/00 359/290 |

FOREIGN PATENT DOCUMENTS

| | | |
|---|---|---|
| JP | 2001-059980 | 3/2001 |
| JP | 2007-199581 | 8/2007 |
| JP | 2009-020270 | 1/2009 |
| JP | 2010-002573 | 1/2010 |
| JP | 2012-181389 | 9/2012 |

OTHER PUBLICATIONS

Written Opinion of the International Searching Authority issued in International Patent Application No. PCT/JP2014/082085, mailed Feb. 3, 2015, along with an English-language translation thereof mail Jun. 30, 3016.

International Search Report issued in International Patent Application No. PCT/JP2014/082085, mailed Feb. 3, 2015, along with an English-language translation thereof.

* cited by examiner

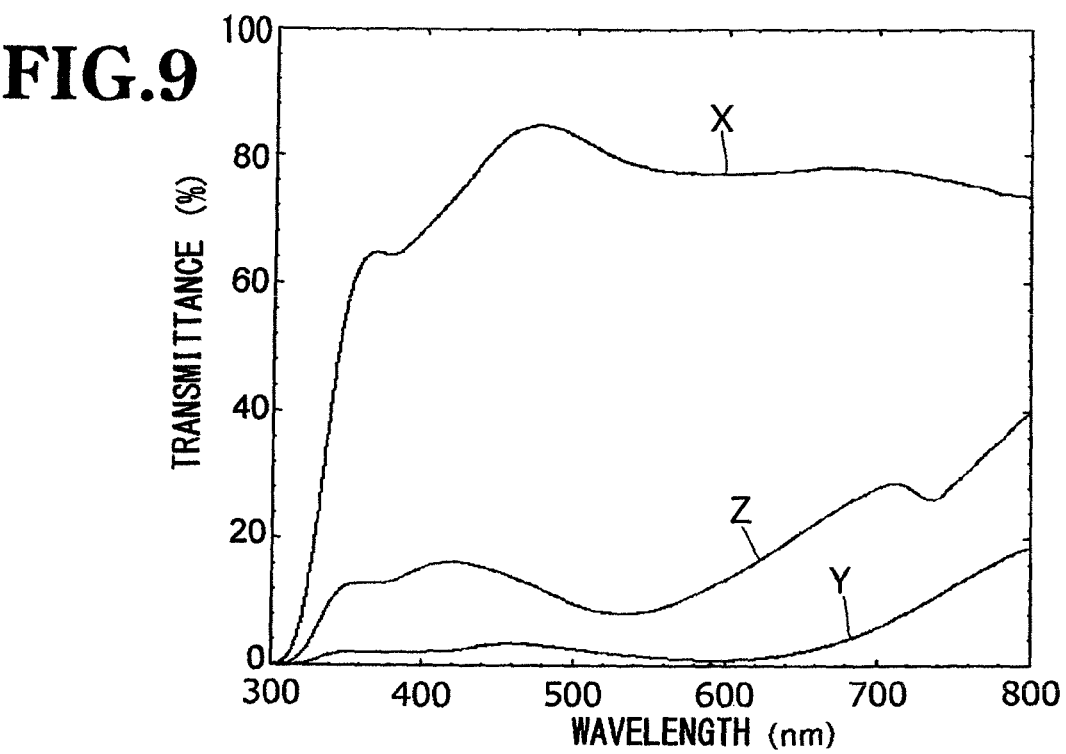

REFLECTANCE VARIABLE ELEMENT AND METHOD FOR MANUFACTURING SAME

The disclosure of Japanese Patent Application No. JP2013-263071 filed on Dec. 19, 2013, including the specification, drawings, claims and abstract, is incorporated herein by reference in its entirety.

TECHNICAL FIELD

This invention relates to an element whose reflectance is reversibly variable and a method for manufacturing the element. In particular, this invention provides a reflectance variable element having a high cold tolerance, the element including an electrolytic solution prepared by dissolving a silver compound in a non-aqueous solvent, to allow a reflective surface (specular surface or diffuse reflective surface) including a deposited layer containing silver to be formed.

BACKGROUND ART

Patent Literatures 1 to 3 and Non Patent Literature 1 each describe a reflectance variable element including a gap, across which paired electrodes are disposed so as to face each other, an electrolytic solution with metal ions dispersed therein being charged in the gap. In the reflectance variable element, upon application of a voltage between the paired electrodes, metal ions in the electrolytic solution can move to one of the electrodes and be deposited on the electrode, and upon cancellation of the voltage application to the paired electrodes or application of a reverse voltage between the paired electrodes in this state, the metal ions can be desorbed from the electrode.

Each of the elements described in Patent Literature 1 and Non Patent Literature 1 uses DMSO (dimethylsulfoxide) as a solvent. In the case of these elements, an electrolytic solution is prepared by dissolving $AgNO_3$ as an electrochromic material, TBABr as a supporting electrolyte and $CuCl_2$ as a mediator, respectively, in this solvent, and PVB (polyvinyl butyral) is added to the electrolytic solution as a polymer.

In the case of the element described in Patent Literature 2, a mixed solvent of DMSO and another solvent is used and an electrolytic solution is prepared by dissolving a metal salt of sliver such as AgF, AgCl, AgBr, AgI or AgSCN in the mixed solvent.

In the case of the element described in Patent Literature 3, an electrolytic solution is prepared by dissolving $NiCl_2$ in dehydrated methanol, mixing this solution into a tetra ethyl ammonium tetra fluoroborate-propylene carbonate solution adding ferrocene to this mixed solution.

CITATION LIST

Patent Literature

Patent Literature 1: Japanese Patent Laid-Open. No. 2012-181389
Patent Literature 2: Japanese Patent Laid-Open No. H10-133236
Patent Literature 3: Japanese Patent Laid-Open No. 2010-002573

Non Patent Literature

Non Patent Literature 1: "Electrochemical Optical-Modulation Device with Reversible Transformation Between Transparent, Mirror, and Black", Advanced Materials, Volume 24, Issue 23, pages OP122-OP126, Jun. 19, 2012

SUMMARY OF INVENTION

Technical Problem

In order to obtain a thin reflectance variable element that allows a reflective surface provided by a deposited layer containing sliver to appear, it is necessary to dissolve a silver compound in a non-aqueous solvent so as to achieve a silver compound concentration sufficient for the reflective surface to appear to prepare an electrolytic solution.

The elements described in Patent Literature 1 and Non Patent Literature 1 enable obtainment of a thin reflectance variable element that allows a reflective surface provided by a deposited layer containing silver to appear. However, DMSO, which is used as a solvent in this element, has a high melting point of 19° C. Thus, if the temperature of the environment of usage of the element falls below 19° C., the metal salt once dissolved, which is a solute, is deposited. Industrial products such as home electrical appliances and automobiles are sometimes used in a low-temperature environment of around −30° C., use of industrial products including a reflectance variable element using DMSO as a solvent under such low-temperature environment causes problems such that reflectance becomes unadjustable.

For cold tolerance improvement, the element described in Patent Literature 2 uses a mixed solvent obtained by mixing a low-melting point, high-boiling point solvent such as propylene carbonate into DMSO. However, this element still uses DMSO, which may result in cold tolerance insufficiency depending on the usage environment.

The element described in Patent Literature 3 is a reflectance variable element not using DMSO. However, a reflectance variable element specifically described in Patent Literature 3 is one including an electrolytic solution prepared using $NiCl_2$ and ferrocene as solutes. Use of ferrocene makes the electrolytic solution turn yellow, and thus this element cannot be used depending on the usage. Patent Literature 3 indicates silver as a kind of metal for forming metal ions, but includes no specific disclosure regarding an electrolytic solution composition and an electrolytic solution preparation step that enable obtainment of a thin reflectance variable element having a high cold tolerance, the element allowing a reflective surface provided by a deposited layer containing silver, to appear.

This invention has been made in view of the aforementioned points, and is intended to provide a reflectance variable element having a high cold tolerance, the element including an electrolytic solution prepared by dissolving a silver compound in a non-aqueous solvent, to allow a reflective surface including a deposited layer containing silver to be formed. Also, this invention is intended to provide a method for manufacturing the element according to this invention.

Solution to Problem

A reflectance variable element according to this invention includes paired electrodes disposed across a gap, and an electrolytic solution charged in the gap, and the electrolytic solution has a composition in which at least silver ions and copper ions, a content by weight of the copper ions being smaller than that of the silver ions, are contained in a solvent that is a non-aqueous solvent, the solvent containing a non-aqueous solvent having a boiling point that is higher than that of methanol and methanol, a content by weight of the methanol being smaller than that of the non-aqueous solvent, and according to variation of an electric field between the paired electrodes, the element transitions between a state in which silver ions and copper ions in the electrolytic solution, move to a surface of one of the electrodes, silver and copper are deposited on the surface of the electrode and a reflectance of the surface part of the electrode is thereby increased and a state in which the silver and the copper are desorbed from the surface of the electrode and the reflectance of the surface part of the electrode is thereby decreased, whereby the reflectance of the surface part of the electrode is reversibly varied. This element enables obtainment of a reflectance variable element having a high cold tolerance, the element including an electrolytic solution prepared by dissolving a silver compound in a non-aqueous solvent without actual use of DMSO, to allow a reflective surface (specular surface or diffuse reflective surface) including a deposited layer containing silver to be formed.

In the reflectance variable element according to this invention, it is possible that the silver ions are ones derived from a metal salt of silver. In this case, the metal salt of silver can be, for example, silver nitrate. Use of silver nitrate enables a sufficient concentration of silver to be dissolved in the non-aqueous solvent, enabling obtainment of a thin reflectance variable element. Where the specular surface is formed using silver nitrate, it is desirable that a content of silver nitrate in the entire electrolytic solution be no less than 0.5 wt %. In other words, if the content of silver nitrate is less than 0.5 wt %, it is difficult to form a specular surface in a thin element. If the content of silver nitrate is no less than 0.5 wt %, a specular surface can be formed even in a thin element. If the content of silver nitrate is 0.55 wt %, a specular surface having a sufficient reflectance can be formed even in a thin element. If the content of silver nitrate is larger than 0.55 wt %, further increase in reflectance cannot be expected much, and rather, silver nitrate, which is expensive, is wasted.

In the reflectance variable element according to this invention, the copper ions can be ones derived from a metal salt of copper. Consequently, use of a metal salt of copper enables obtainment of a reflectance variable element. In this case, the metal salt of copper can be, for example, copper chloride.

In the reflectance variable element according to this invention, as the non-aqueous solvent having a boiling point, that is higher than that of methanol, for example, propylene carbonate or γ-butyrolactone can be used. Consequently, use of propylene carbonate or γ-butyrolactone, which has a melting point that is lower than that of DMSO, enables obtainment of a reflectance variable element having a favorable cold tolerance.

In the reflectance variable element according to this invention, a distance of the gap can be, for example, no less than 100 μm and no more than 1 mm. Consequently, a thin reflectance variable element can be obtained.

In the reflectance variable element according to this invention, a polymer can be added in the electrolytic solution. Consequently, the addition of the polymer in the electrolytic solution increases a viscosity of the electrolytic solution, enabling prevention of the electrolytic solution from being spattered when the element is broken.

A method for manufacturing a reflectance variable element according to this invention includes: an electrolytic solution preparation step of preparing an electrolytic solution, the step including the steps of preparing silver salt-methanol solution by dissolving a metal salt of silver in methanol, preparing a copper metal salt-methanol solution by dissolving a metal salt of copper in methanol, mixing the silver salt-methanol solution and the copper metal salt-methanol solution into a non-aqueous solvent having a boiling point, that is higher than that of methanol, weight of the non-aqueous solvent being larger than that of a total of the silver salt-methanol solution and the copper metal salt-methanol solution, and dissolving a supporting electrolyte in the non-aqueous solvent before or after mixing the silver salt-methanol solution and the copper metal salt-methanol solution into the non-aqueous solvent; and a charging step of charging the prepared electrolytic solution into a gap between paired electrodes, and according to variation of an electric field between the paired electrodes, the element transitions between a state in which silver ions and copper ions in the electrolytic solution move to a surface of one of the electrodes, silver and copper are deposited on the surface of the electrode and a reflectance of the surface part of the electrode is thereby increased and a state in which the silver and the copper are desorbed from the surface of the electrode and the reflectance of the surface part of the electrode is thereby decreased, whereby the reflectance of the surface part of the electrode is reversibly varied. The method according to this invention enables manufacture of the reflectance variable element according to this invention.

In the method for manufacturing a reflectance variable element according to this invention, the metal salt of silver can be silver nitrate. Consequently, the reflectance variable element according to this invention can be manufactured using silver nitrate.

BRIEF DESCRIPTION OF DRAWINGS

FIG. 9 is a graph indicating spectral characteristics of transmittance measured for a certain sample of the specular reflection/transmission-type element in FIG. 1.

DESCRIPTION OF EMBODIMENTS

<<Embodiment 1(Specular Reflection/Transmission-Type Element)>>

Figure 1:
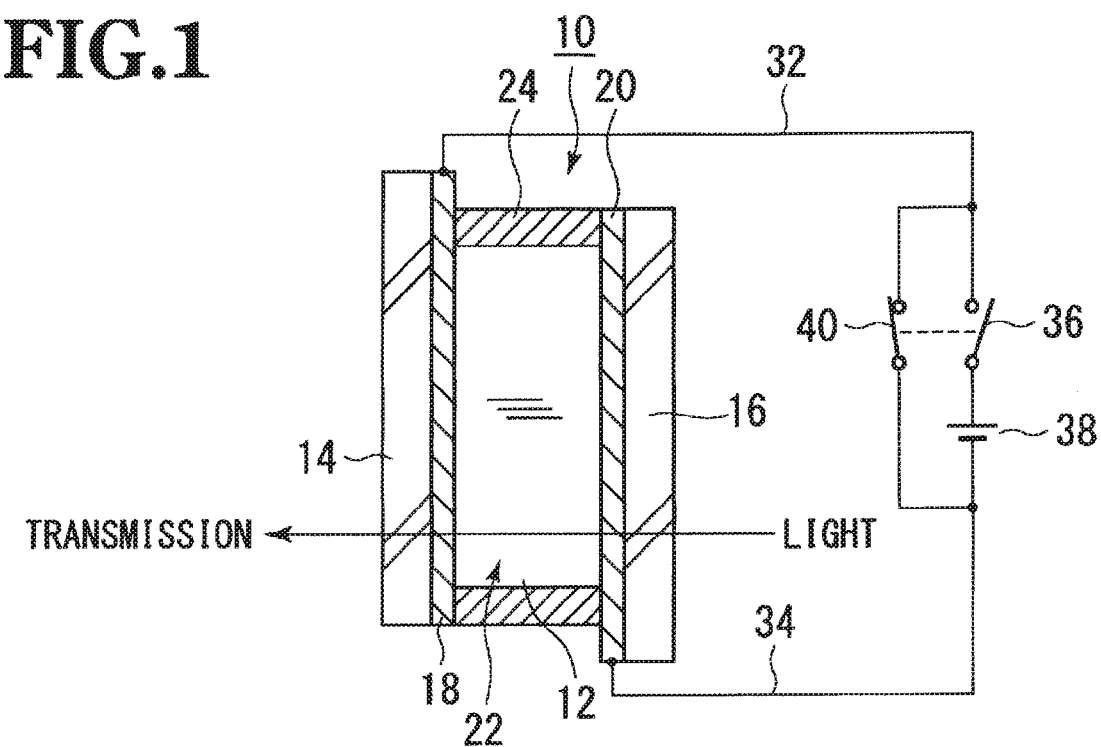
FIG. 1 includes a schematic cross-sectional view and an electric circuit diagram illustrating an embodiment of a specular reflection (regular reflection)/transmission-type reflectance variable element according to this invention, which provides a diagram illustrating a state in which both electrodes are short-circuited.

An embodiment in which a reflectance variable element according to this invention is configured as a thin specular reflection/transmission-type reflectance variable element (reflectance variable element that allows a reflective surface to provide a specular surface and is transmissive in a thickness direction when a reflectance is low) will be described hereinafter. In FIG. 1, a specular reflection/transmission-type reflectance variable element 10 (hereinafter "specular reflection/transmission-type element 10") includes two transparent substrates 14, 16 of glass or resin disposed so as to face each other across a gap 12. Respective surfaces of the transparent substrates 14, 16 are flat and smooth. On surfaces of the transparent substrates 14, 16, the surfaces facing each other, respective transparent conductive films 18, 20, which form an electrode pair, are formed. Each of the transparent conductive films 18, 20 is formed of, for example, ITO (iridium tin oxide), tin oxide or zinc oxide. An electrolytic solution 22 is charged in the gap 12. A periphery of the gap 12 is sealed by a sealing material 24. The electrolytic solution 22 is formed by dissolving $AgNO_3$ (silver nitrate), $CuCl_2$ (cupric chloride) and LiBr, which is a supporting electrolyte, as solutes, in a non-aqueous solvent containing propylene carbonate as a main component (component, a content by weight of which is highest) and a methanol as an accessory component (component, a content by weight of which is lower than that of the main component). A content by weight of the silver nitrate in the electrolytic solution 22 is higher than a content by weight of the cupric chloride. A polymer such as polypropylene, polyvinyl butyral or polymethyl methacrylate can be added in the electrolytic solution 22 as a thickener. Respective one end portions of lead wires 32, 34 are connected to respective transparent conductive films 18, 20. A serial connection circuit including a switch 36 and a direct-current power supply 38 is connected between respective other end portions of the lead wires 32, 34. Also, a switch 40 is connected between the lead wires 32, 34 in parallel with the serial connection circuit including the switch 36 and the direct-current power supply 38. The switches 36, 40 are interlocked with each other and are turned on/off in respective directions that are opposite to each other.

Operation of the specular reflection/transmission-type element 10 configured as above will be described. When the switch 36 is off and the switch 40 is on as in FIG. 1, the transparent conductive films 18, 20 are short-circuited, and thus no electric field is generated between the transparent conductive films 18, 20. Therefore, in the electrolytic solution 22, metal cations $Ag^+$ and $Cu^{2+}$ and anions $NO_3^-$ and $Cl^-$ are dispersed. Here, the electrolytic solution 22 is substantially colorless and transparent, and the entirety of the specular reflection/transmission-type element 10 from the transparent substrate 14 to the transparent substrate 16 is substantially colorless and transparent in the thickness direction (the transparent conductive films 18, 20 may be slightly colored).

Figure 2:
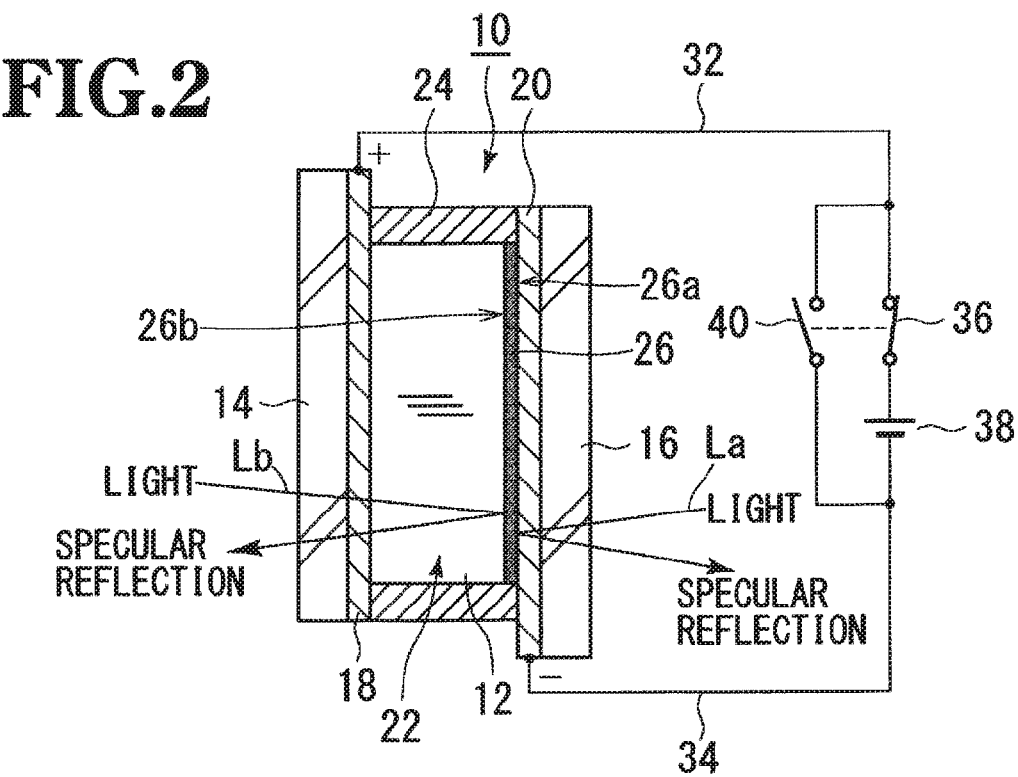
FIG. 2 is a diagram illustrating a state in which a voltage is applied between the electrodes in the reflectance variable element in FIG. 1.

When the switch 36 is turned on and the switch 40 is turned off as in FIG. 2 from the state in FIG. 1, a voltage from the direct-current power supply 38 is applied between the transparent conductive films 18, 20 (the transparent conductive film 18 is a positive electrode and the transparent conductive film 20 is a negative electrode) and an electric field is generated between the transparent conductive films 18, 20. The electric field causes metal cations $Ag^+$ and $Cu^{2+}$ in the electrolytic solution 22 to move to a surface of the negative electrode 20 and be reduced. As a result, a deposited layer (specular reflection layer) 26 containing silver as a main component, with a small amount of copper mixed therein as an accessory component, is deposited on the surface of the negative electrode 20, whereby a reflective surface (specular surface) 26a provided by the deposited layer 26 appears. Consequently, the specular reflection/transmission-type element 10 has an increased reflectance (reflectance provided mainly by specular reflection) and a decreased transmittance and thus serves as a mirror or half mirror. The voltage applied between the transparent conductive films 18, 20 can be made variable in a stepwise or stepless manner, enabling stepwise or stepless adjustment of the reflectance and the transmittance. Or, the voltage applied between the transparent conductive films 18, 20 is made to be a voltage obtained by subjecting a direct-current voltage (direct-current voltage having a magnitude providing a desired highest reflectance or a lowest transmittance) to pulse width modulation and a duty cycle of pulses resulting from the pulse width modulation is made to be variable in a stepwise or stepless manner, enabling stepwise or stepless adjustment of the reflectance and the transmittance. The specular reflection/transmission-type element 10 can be used as an element that reflects light La entering from the right side (transparent substrate 16 side) of the specular reflection/transmission-type element 10 in FIG. 2, by means of the specular surface 26a, which is a surface of the deposited layer 26 viewed from the right side. In addition, the specular reflection/transmission-type element 10 can be used as an element that reflects light Lb entering from the left side (transparent substrate 14 side) of the specular reflection/transmission-type element 10, by means of a specular surface 26b, which is a surface of the deposited layer 26 viewed from the left side. Furthermore, the specular reflection/transmission-type element 10 can be used as an element that reflects light entering from both of the right and left sides of the specular reflection/transmission-type element 10, by means of the right and left specular surfaces 26a, 26b.

Figure 8:
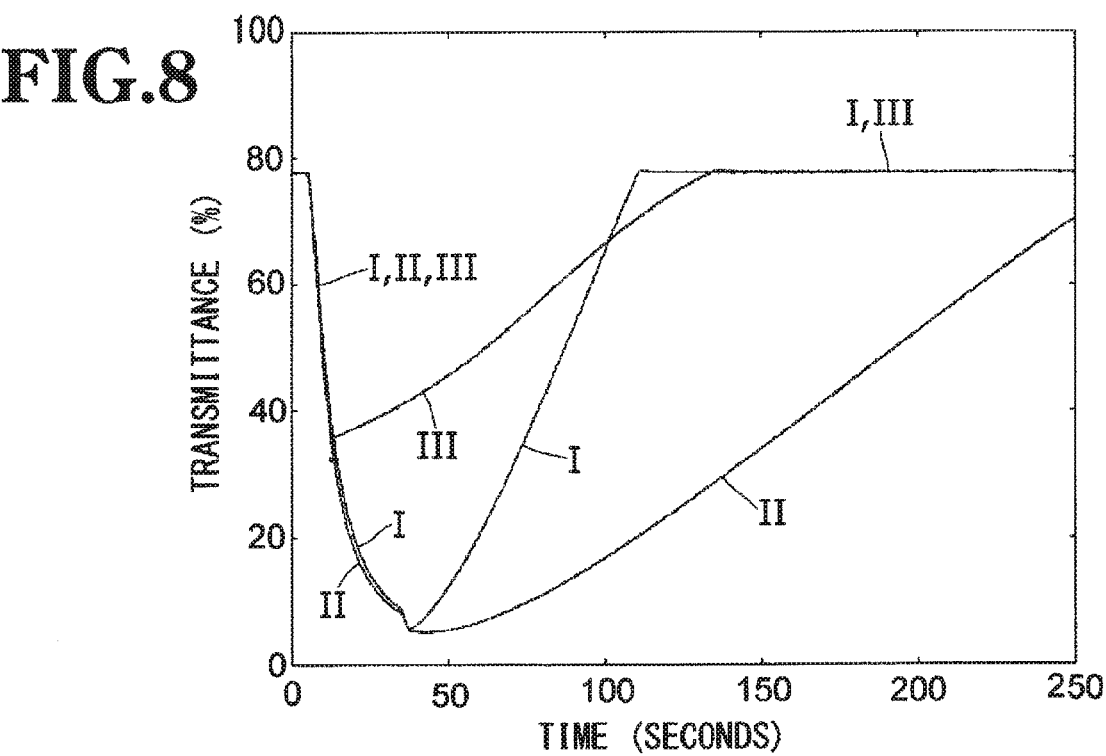
FIG. 8 is a graph indicating temporal variation characteristics of transmittance measured for a certain sample of the specular reflection/transmission-type element in FIG. 1.

When the switch 36 is turned off and the switch 40 is turned on as in FIG. 1 again from the state in FIG. 2, the transparent conductive films 18, 20 are short-circuited and the electric field between the transparent conductive films 18, 20 disappears. Consequently, silver and copper forming the deposited layer 26 are oxidized and desorbed from the surface of the negative electrode 20, and turn into metal cations $Ag^+$ and $Cu^{2+}$, which are then dispersed in the electrolytic solution 22 again. Since the deposited layer 26 is formed by silver, which is a main component, with copper mixed therein, such desorption is possible. As a result, the specular reflection/transmission-type element 10 has a lowered reflectance and an increased transmittance and returns to the original transparent state. Instead of the short-circuiting of the electrode 18, 20, the electrodes 18, 20 can be opened. In other words, if the electrodes 18, 20 are opened, the electric field between the electrodes 18, 20 disappears, enabling metal cations $Ag^+$ and $Cu^{2+}$ to be desorbed from the negative electrode 20 and the specular reflection/transmission-type element 10 to return to the original transparent state. In other words, when the switches 36, 40 are both turned off from the state in FIG. 2 to open the electrodes 18, 20, the reflectance decreases and the transmittance increases at a sedate rate compared to the case where the electrodes 18, 20 are short-circuited, and the specular reflection/transmission-type element 10 thereby returns to the original transparent state. FIG. 8 indicates temporal variation characteristics of transmittance measured upon application of a direct-current voltage having a magnitude enabling the transmittance to be lowered to substantially 0% to a certain sample of the specular reflection/transmission-type element 10. Characteristics I, II and III indicate the following.

Characteristic I: Characteristic exhibited when the direct-current voltage was applied between the electrodes 18, 20 in a state in which an initial transmittance was approximately 77% (the numerical value of the transmittance is a value at a wavelength of 550 nm. The same applies to the following) and then the electrodes 18, 20 were short-circuited upon decrease of the transmittance to 7% as a result of the application of the direct-current voltage Characteristic II: Characteristic exhibited when the direct-current voltage, which is the same as that used in measurement of characteristic I, was applied between the electrodes 18, 20 in a state in which an initial transmittance was approximately 77% and then the electrodes 18, 20 were opened upon decrease of the transmittance to 7% as a result of the application of the direct-current voltage Characteristic III: Characteristic exhibited when the direct-current voltage, which is the same as that used in measurement of characteristics I and II, was applied between the electrodes 18 and 20 in a state in which an initial transmittance was approximately 77% and then the electrodes 18, 20 were opened upon decrease of the transmittance to 35% as a result of the application of the direct-current voltage From FIG. 8, it can be seen that a rate of increase of the transmittance from the decreased transmittance is high when the electrodes 18, 20 are short-circuited, and is low when the electrodes 18, 20 are opened.

According to the above, the reflectance and the transmittance of the specular reflection/transmission-type element 10 can reversibly be varied by applying an electric field between the electrodes 18, 20 and cancelling the application of the electric field.

The specular reflection/transmission-type element 10 is favorable for use as, for example, a light control glass window for a building or a light control glass window for an automobile. In other words, in summer, the transmittance is lowered (reflectance is raised) to reflect ultraviolet light and infrared light, enabling enhancement in room cooling efficiency, and in winter, the transmittance is raised (reflectance is lowered), enabling enhancement in room heating efficiency. As result, an energy saving effect can be obtained. Also, the transmittance is lowered (reflectance is raised), enabling obtainment of a screening effect to block sight lines from the outside of the room.

The specular reflection/transmission-type element 10 can also be used as a substitute device of a light control filter for a camera. In other words, the specular reflection/transmission-type element 10 is disposed on an optical axis in a camera and a voltage applied between the electrodes 18, 20 is varied in a stepwise or stepless manner. Or, a voltage applied between the transparent conductive film 18, 20 is made to be a voltage obtained by subjecting a direct-current voltage (direct-current voltage having a magnitude providing a desired lowest transmittance) to pulse width modulation, and a duty cycle of pulses resulting from the pulse width modulation is varied in a stepwise or stepless manner. Stepwise or stepless adjustment of the transmittance of the specular reflection/transmission-type element 10 as above enables provision of a light control filter having no mechanical operation part. FIG. 9 indicates spectral characteristics of transmittance measured for a certain sample of the specular reflection/transmission-type element 10. Characteristics X, Y and Z are indicate the following.

Characteristic X: Characteristic exhibited when the element 10 was transparent (the transmittance was approximately 77%) as a result of the electrodes 18, 20 being continuously short-circuited or opened and thus an electric field between the electrodes 18, 20 disappearing.

Characteristic Y: Characteristic exhibited when the element 10 provided a specular surface (the transmittance was substantially 0%) as a result of a direct-current voltage having a magnitude that enables the transmittance to be lowered to substantially 0% being continuously applied between the electrodes 18, 20 and an electric field between the electrodes 18, 20 being saturated.

Characteristic Z: Characteristic exhibited when the element 10 was in an intermediate state between the transparent state and the specular surface state (achromatic half mirror state) as a result of an electric field that is intermediate between that in the case of characteristic X and that in the case of characteristic Y being generated between the electrodes 18, 20.

According to FIG. 9, a ND (neutraldensity) filter can be formed using characteristic Z in an intermediate state. Then, a variable ND filter can be formed by making an intensity of an electric field in this intermediate state to be adjustable in a stepwise or stepless manner. Examples of a method for adjusting the transmittance of the specular reflection/transmission-type element 10 to an intermediate desired transmittance between that in the specular surface state and that in the transparent state and maintaining the transmittance may include the following methods.

Method 1: A magnitude of a direct-current voltage to be applied between the electrodes 18, 20 is adjusted to a value providing a desired transmittance that is intermediate between that in the specular surface and that in the transparent state, and the adjusted direct-current voltage is continuously applied. Here, in order for the transmittance to quickly reach a target value, it is possible to set a direct-current voltage value to a voltage value that provides a transmittance exceeding the target value at the beginning of the adjustment, and at or immediately before the time when the transmittance reaches the target value, return the voltage value to a voltage value that maintains the target value of the transmittance.

Method 2: A magnitude of a direct-current voltage to be applied between the electrodes 18, 20 is set to a value providing a desired lowest transmittance, and the direct-current voltage is subjected to pulse width modulation and then applied between the electrodes 18, 20. A duty cycle of pulses resulting from the pulse width modulation is adjusted to a value that maintains a desired transmittance, and the adjusted pulse width-modulated voltage is continuously applied. Here, in order for the transmittance to quickly reach a target value, it is possible to set the duty cycle of the pulse width-modulated voltage to a value that provides a transmittance exceeding the target value at the beginning of the adjustment and return the duty cycle to a value that maintains the target value of the transmittance at or immediately before the time when the transmittance reaches the target value.

If an ND filter is formed by the specular reflection/transmission-type element 10, it is desirable to obtain a high transmittance in a transparent state, and thus it is desirable that the transparent substrates 14, 16 be formed by optical glass (white glass) having a high transmittance and an antireflection film be formed on outer surfaces of the transparent substrates 14, 16.

Also, the specular reflection/transmission-type element 10 can be formed as a display using metallic reflection, by dividing the transparent conductive film 20 into segments and applying a voltage to each of segments.

EXAMPLE

An example of the specular reflection/transmission-type element 10 in FIG. 1 will be described. In this example, the specular reflection/transmission-type element 10 in FIG. 1 was fabricated through the following procedure.

(1) In this example, anhydrous silver nitrate and anhydrous copper chloride (cupric chloride) were used as solutes, and propylene carbonate was used as a main component of a solvent. Weight of the anhydrous silver nitrate used was larger than weight of the anhydrous copper chloride used. Anhydrous silver nitrate and anhydrous copper chloride are insoluble in propylene carbonate. Therefore, the anhydrous silver nitrate and the anhydrous copper chloride were dissolved in dehydrated methanol. As a result of a test of a saturated solubility of anhydrous silver nitrate in dehydrated methanol, the saturated solubility was 5 wt %. Consequently, a 5 wt % saturated solubility-silver nitrate-methanol solution was prepared.

(2) A copper chloride-methanol solution was prepared by dissolving anhydrous copper chloride in dehydrated methanol. In this case, if a concentration of the copper chloride is high, a transparency of the electrolytic solution 22 is low. Therefore, a 1 wt % copper chloride-methanol solution was prepared as a copper chloride-methanol solution having a concentration that enables desorption of metal cations $Ag^+$ and $Cu^{2+}$ from the surface of the negative electrode 20 and also enables provision of a sufficient transparency of the electrolytic solution 22.

(3) 0.5 mol/L of an LiBr-propylene carbonate solution was prepared by dissolving anhydrous LiBr, which is a supporting electrolyte, in propylene carbonate.

(4) The 5 wt %-silver nitrate-methanol solution A prepared in step (1), the 1 wt %-copper chloride-methanol solution B prepared in step (2) and the 0.5 mol/L-LiBr-propylene carbonate solution C prepared in step (3) were mixed at a weight ratio of A:B:C=10:1:80 to prepare an electrolytic solution 22. Here, a content of silver nitrate in the entire electrolytic solution 22 was 5 wt %×{10/(10+1+80)}=0.55 wt %.

(5) Two square transparent substrates 14, 16 each having four sides of 5 cm were provided, and these transparent substrates 14, 16 were disposed so as to face each other across a gap 12, a distance of which was 300 μm. On surfaces of the transparent substrates 14, 16, the surfaces facing each other, respective ITO transparent conductive films 18, 20 were formed. Surface resistance values of the ITO transparent conductive films 18, 20 were 10 Ω/□.

(6) The electrolytic solution 22 prepared in step (4) was charged into the gap 12, and after the charging, a periphery of the gap 12 was sealed by a sealing material 24, whereby a specular reflection/transmission-type element 10 was completed. The completed specular reflection/transmission-type element 10 was transparent in a thickness direction.

Various characteristics of the specular reflection/transmission-type element 10 fabricated through the above procedure were measured as follows, by connecting an electric circuit to the specular reflection/transmission-type element 10 as in FIG. 1.

[Test 1: Confirmation of finally-reached upper and lower limit values of transmittance]

Figure 3:
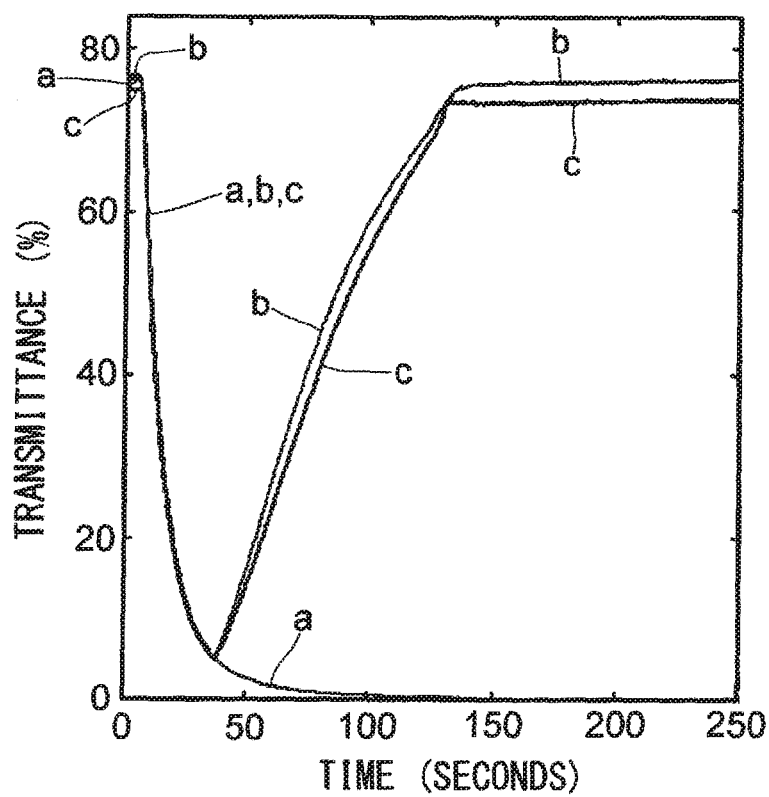
FIG. 3 is a graph indicating temporal variation characteristics of transmittance when a voltage was applied between paired electrodes in the reflectance variable element in FIG. 1 and when the paired electrodes were short-circuited after the voltage application.

First, an initial transmittance of the specular reflection/transmission-type element 10 before application of a voltage was approximately 77%. From the state in which the switch 36 was off and the switch 40 was on in FIG. 1, the switch 36 was turned on and the switch 40 was turned off as in FIG. 2 to apply a voltage of 2.1 V between the electrodes 18, 20 from the direct-current power supply 38. In FIG. 3, line a indicates variation in transmittance of the specular reflection/transmission-type element 10 in this case. In other words, upon the start of the application, the transmittance was lowered over time from the initial value of approximately 77% along with increase in thickness of a deposited layer 26, became approximately 5% in thirty seconds from the start of the application and finally became substantially 0%. With lowering of the transmittance, the specular surface 26a of the deposited layer 26 exhibited a silver color. From the state that provided the transmittance of substantially 0%, the switches 36, 40 were returned to the state in FIG. 1 and the electrodes 18, 20 were short-circuited, and then, along with decrease in thickness of the deposited layer 26, the silver color of the specular surface 26a become lighter, and the transmittance gradually rose and finally returned to the initial value of approximately 77%. Accompanying this, the deposited layer 26 disappeared and the specular reflection/transmission-type element 10 was returned to the original state in which the specular reflection/transmission-type element 10 was transparent in the thickness direction.

[Test 2: Confirmation of cold tolerance]

From the state in which the switch 36 was off and the switch 40 was on in FIG. 1, the switch 36 was turned on and the switch 40 was turned off as in FIG. 2 to apply a voltage of 2.1 V between the electrodes 18, 20. Subsequently, the switches 36, 40 were returned to the state in FIG. 1 thirty seconds from the start of the application to short-circuit the electrodes 18, 20. In FIG. 3, line b indicates variation in transmittance of the specular reflection/transmission-type element 10 in this case. In other words, upon the start of the application, the transmittance was lowered over time from the initial value of approximately 77% and became approximately 5% in thirty seconds from the application. Upon the state being switched to the short-circuited state, the transmittance rose over time and was returned to approximately 76% in approximately two minutes from the start of the short-circuiting.

Next, when the specular reflection/transmission-type element 10, from which characteristic b in FIG. 3 had been measured, was left under an environment of −30° C. for 24 hours and then taken out from the environment, no metal salt deposition was observed in the specular reflection/transmission-type element 10. A test that is similar to the above was conducted for the specular reflection/transmission-type element 10 taken out from the low temperature environment. In other words, from the state in which the switch 36 was off and the switch 40 was on in FIG. 1, the switch 36 was turned on and the switch 40 was turned off as in FIG. 2 to apply a voltage of 2.1 V between the electrodes 18, 20. Subsequently, in thirty seconds from the start of the application, the switches 36, 40 were returned to the state in FIG. 1 to short-circuit the electrodes 18, 20. In FIG. 3, line c indicates variation in transmittance of the specular reflection/transmission-type element 10 in this case. In other words, upon the start of the application, the transmittance was lowered over time from approximately 75%, which was a value immediately after the specular reflection/transmission-type element 10 being taken out from the low temperature environment, and became approximately 5% in thirty seconds from the start of the application. Upon the state being switched to the short-circuited state, the transmittance rose over time and was returned to approximately 73% in approximately two minutes from the start of the short-circuiting. Accordingly, this test shows that the specular reflection/transmission-type element 10 has sufficient cold tolerance. In other words, a thin reflectance variable element having a high cold tolerance, the element allowing a specular surface 26a provided by a deposited layer 26 containing silver to appear, can be obtained by preparing an electrolytic solution by dissolving a silver compound in a non-aqueous solvent without using DMSO.

[Test 3: Confirmation of performance when voltage Application and Short-Circuiting were Repeated]

From the state in which the switch 36 was off and the switch 40 was on in FIG. 1, the switch 36 was turned on and the switch 40 was turned off as in FIG. 2 to apply a voltage of 2.1 V between the electrodes 18, 20. Next, after thirty seconds from the start of the application, the switches 36, 40 were returned to the state in FIG. 1 to short-circuit the electrodes 18, 20 for four minutes. With these series of operation as one cycle, 1000 cycles of this operation were performed successively. Subsequently, in the state in which the switch 36 was off and the switch 40 was on in FIG. 1, the switch 36 was turned on and the switch 40 was turned off as in FIG. 2 to continuously apply a voltage of 2.1 V between the electrodes 18, 20 from the direct-current power supply 38, and a finally-reached lower limit value of the transmittance of the specular reflection/transmission-type element 10 was measured. Furthermore, subsequently, the switches 36, 40 were returned to the state in FIG. 1 to continuously short-circuit the electrodes 18, 20, and a finally-reached upper limit value of the transmittance of the specular reflection/transmission-type element 10 was measured. As a result, although a response speed is slightly lowered compared to that before the 1000-cycle repetition test, the finally-reached lower limit value of the transmittance was substantially 0% and the finally-reached upper limit value of the transmittance was approximately 77%, which was the same as the initial value. Therefore, this result shows that reversible performance is maintained even through repetition of voltage application and short-circuiting.

<<Embodiment 2(specular reflection/non-transmission-type element>>

Figure 4:
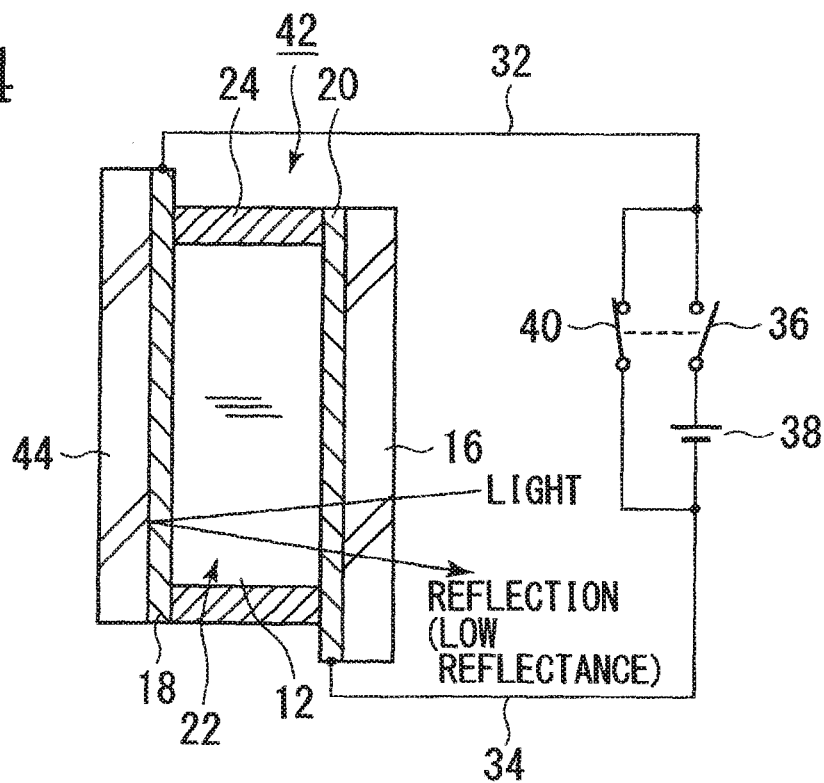
FIG. 4 includes a schematic cross-sectional view and an electric circuit diagram illustrating an embodiment of a specular reflection/non-transmission-type reflectance variable element according to this invention, which illustrates a state in which both electrodes are short-circuited.

An embodiment in which a reflectance variable element according to this invention is formed as a thin specular reflection/non-transmission-type reflectance variable element (reflectance variable element that allows a reflective surface to be a specular surface and is non-transmissive in a thickness direction when a reflectance is low) will be described below. For parts that are in common to those of Embodiment 1, reference numerals that are the same as those of Embodiment 1 will be used. In FIG. 4, a specular reflection/non-transmission-type reflectance variable element 42 (hereinafter "specular reflection/non-transmission-type element 42") includes a non-transparent substrate 44 and a transparent substrate 16 disposed so as to face each other across a gap 12. The non-transparent substrate 44 is formed of a substrate of, e.g., glass, ceramic, resin or metal having, for example, a surface of a dark color (e.g., black), and a reflectance of the surface is low. A surface of the non-transparent substrate 44 can be formed as a flat and smooth surface or can also be formed as a minutely projecting and recessed surface to provide diffuse reflectivity. On respective surfaces of the non-transparent substrate 44 and the transparent substrates 16, the surfaces facing each other, respective transparent conductive films 18, 20, which form an electrode pair, are formed. An electrolytic solution 22 is charged in the gap 12. A periphery of the gap 12 is sealed by a sealing material 24. The electrolytic solution 22 is the same as that used in Embodiment 1. A polymer such as polypropylene, polyvinyl Dutyral or polymethyl methacrylate can be added in the electrolytic solution 22 as a thickener. Respective one end portions of lead wires 32, 34 are connected to the respective transparent conductive films 18, 20. A serial connection circuit including a switch 36 and a direct-current power supply 38 is connected between respective other end portions of the lead wires 32, 34. Also, a switch 40 is connected between the lead wires 32, 34 in parallel with the serial connection circuit including the switch 36 and the direct-current power supply 38. The switches 36, 40 are interlocked with each other and are turned on/off in respective directions that are opposite to each other.

Operation of the specular reflection/non-transmission-type element 42 configured as above will be described. As in FIG. 4, when the switch 36 is off and the switch. 40 is on, the transparent conductive films 18, 20 are short-circuited, and thus no electric field is generated between the transparent conductive films 18, 20. Therefore, in the electrolytic solution 22, metal cations $Ag^+$ and $Cu^-$ and anions $NO_3^-$ and $Cl^-$ are in a disperse state. Here, the electrolytic solution 22 is transparent, and light entering from the surface side of the transparent substrate 16 falls on and substantially fully absorbed by the non-transparent substrate 44. Therefore, a reflectance as viewed from the front side of the transparent substrate 16 in this case is low.

Figure 5:
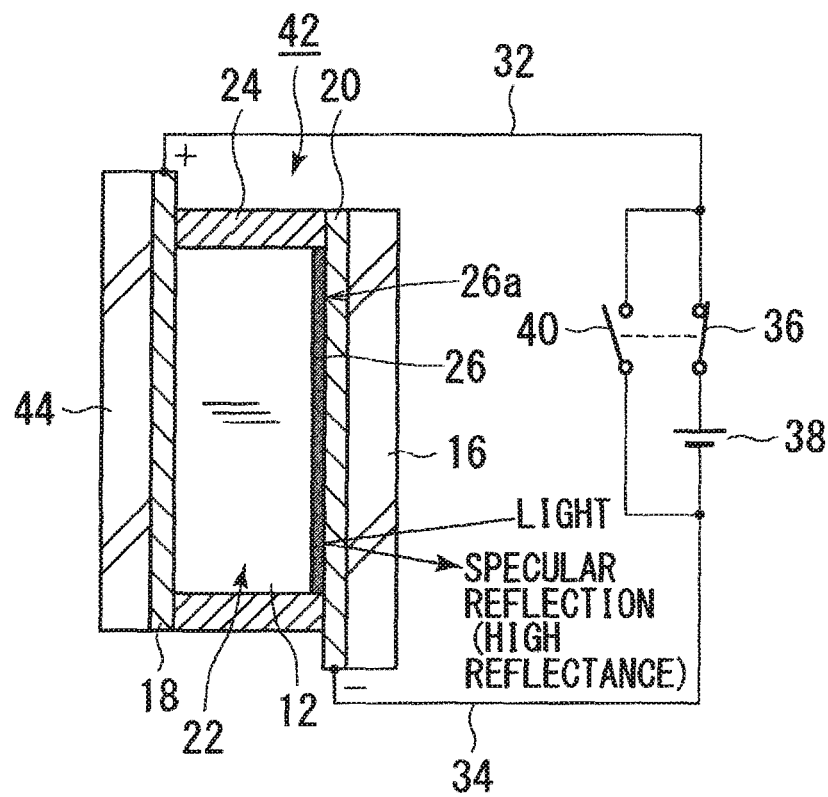
FIG. 5 is a diagram illustrating a state in which a voltage is applied between the electrodes in the reflectance variable element in FIG. 4.

When the switch. 36 is turned on and the switch 40 is turned off as in FIG. 5 from the state in FIG. 4, a voltage from the direct-current power supply 38 is applied between the transparent conductive films 18, 20 (the transparent conductive film 18 is a positive electrode and the transparent conductive film 20 is a negative electrode) and an electric field is generated between the transparent conductive films 18, 20. The electric field causes the metal cations $Ag^+$ and $Cu^{2+}$ in the electrolytic solution 22 to move to a surface of the negative electrode 20 and be reduced. As a result, a deposited layer (specular reflection layer) 26 containing silver as a main component, with a small amount of copper mixed therein as an accessory component, is deposited on the surface of the negative electrode 20, whereby a reflective surface (specular surface) 26a provided by the deposited layer 26 appears. Consequently, the specular reflection/non-transmission-type element 42 has an increased reflectance (reflectance provided mainly by specular reflection) as viewed from the front side of the transparent substrate 16. The voltage applied between the transparent conductive films 18, 20 can be made variable in a stepwise or stepless manner, enabling stepwise or stepless adjustment of the reflectance. Or, the voltage applied between the transparent conductive films 18, 20 is made to be a voltage obtained by subjecting a direct-current voltage (direct-current voltage having a magnitude providing a desired highest reflectance) to pulse width modulation and a duty cycle of pulses resulting from the pulse width modulation is made to be variable in a stepwise or stepless manner, enabling stepwise or stepless adjustment of the reflectance.

When the switch 36 is turned off and the switch 40 is turned on as in FIG. 4 again from the state in FIG. 5, the transparent conductive films 18, 20 are short-circuited and the electric field between the transparent conductive films 18, 20 disappears. Consequently, silver and copper forming the deposited layer 26 are oxidized and desorbed from the surface of the negative electrode 20, and turn into metal cations $Ag^+$ and $Cu^{2+}$, which are then dispersed in the electrolytic solution 22 again. Since the deposited layer 26 is formed by silver, which is a main component, with copper mixed therein, such desorption is possible. As a result, the specular reflection/non-transmission-type element 42 has a lowered reflectance as viewed from the front side of the transparent substrate 16 and returns to the original state. Instead of the short-circuiting of the electrodes 18, 20, the electrodes 18, 20 can be opened. In other words, if the electrodes 18, 20 are opened, the electric field between the electrodes 18, 20 disappears, enabling metal cations $Ag^+$ and $Cu^{2+}$ to be desorbed from the negative electrode 20 and the specular reflection/non-transmission-type element 42 to return to the original state in which the reflectance is low. In other words, when the switches 36, 40 are both turned off from the state in FIG. 5 to open the electrodes 18, 20, the reflectance is lowered at a sedate rate compared to the case where the electrodes 18, 20 are short-circuited, and the specular reflection/non-transmission-type element 42 thereby returns to the original state in which the reflectance is low.

According to the above, the reflectance as viewed from the front side of the transparent substrate 16 of the specular reflection/non-transmission-type element. 42 can reversibly be varied by applying an electric field between the electrodes 18, 20 and cancelling the application of the electric field.

The specular reflection/non-transmission-type element 42 can be fabricated through a procedure that is similar to that described in the example of the Embodiment 1.

The specular reflection/non-transmission-type element 42 can be used as, for example, a glare-proof mirror for a vehicle. Also, the specular reflection/non-transmission-type element 42 can be formed as a display using metallic reflection, as a result of dividing the transparent conductive film 20 into segments and applying a voltage to each of the segments.

<<Embodiment 3(Diffuse reflection/transmission-type element)>>

Figure 6:
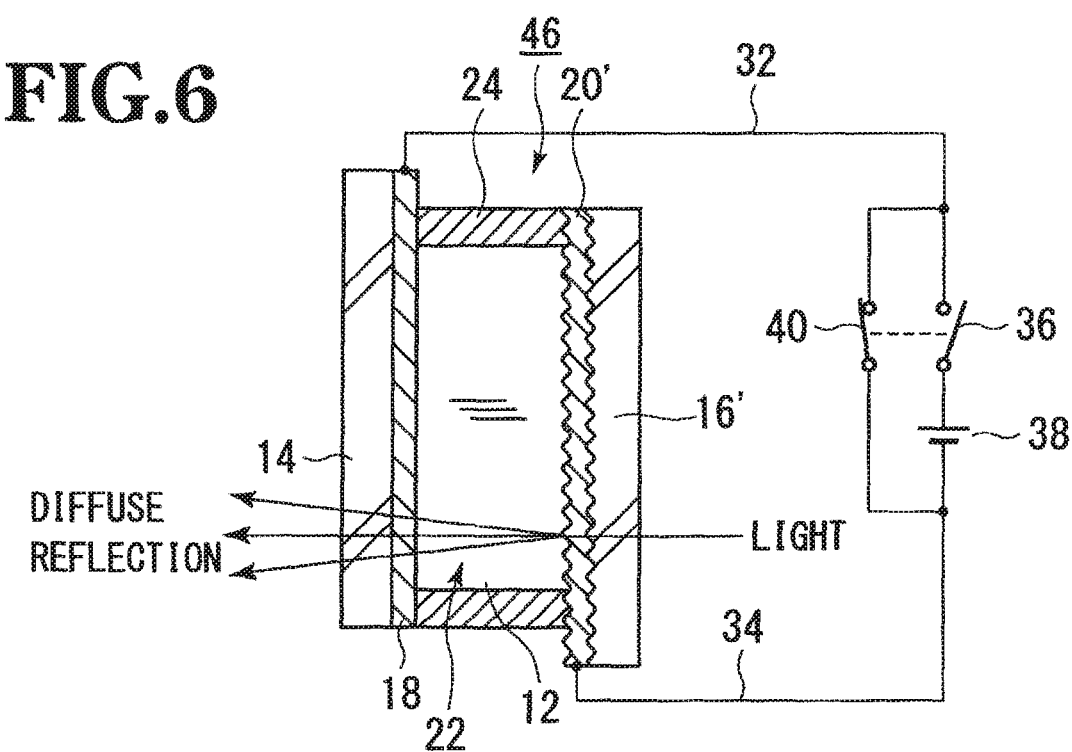
FIG. 6 includes a schematic cross-sectional view and an electric circuit diagram illustrating an embodiment of a diffuse reflection/transmission-type reflectance variable element according to this invention, and is a diagram illustrating a state in which both electrodes are short-circuited.

An embodiment in which a reflectance variable element according to this invention is formed as a thin diffuse reflection/transmission-type reflectance variable element (reflectance variable element that allows a reflective surface to be a diffuse reflective surface and is transmissive in a thickness direction when a reflectance is low) will be described below. For parts that are in common to those of Embodiment 1, reference numerals that are the same as those of Embodiment 1 will be used. In FIG. 6, a surface on the inner side of the transparent substrate 16' (surface on the side on which a deposited layer 26 is deposited) of a diffuse reflection/transmission-type reflectance variable element 46 (hereinafter "diffuse reflection/transmission-type element 46") is formed as a minutely projecting and recessed surface. Along the projection and recessed surface of the transparent substrate 16', a transparent conductive film 20' is formed in a projection and recessed shape. The rest of configuration is the same as that of the specular reflection/transmission-type element 10 in FIG. 1.

Operation of the diffuse reflection/transmission-type element 46 configured as above will be described. When the transparent conductive films 18, 20' in FIG. 6 are short-circuited, metal cations $Ag^+$ and $Cu^{2+}$ and anions $NO_3^-$ and $Cl^-$ are dispersed in the electrolytic solution 22. Here, the electrolytic solution 22 is substantially colorless and transparent. Light entering the diffuse reflection/transmission-type element 46 is diffused by the projection and recessed surfaces of the transparent substrate 16' and the transparent conductive film 20' and penetrates through the diffuse reflection/transmission-type element 46. Therefore, sight on the opposite side viewed through the diffuse reflection/transmission-type element 46 is obscure.

Figure 7:
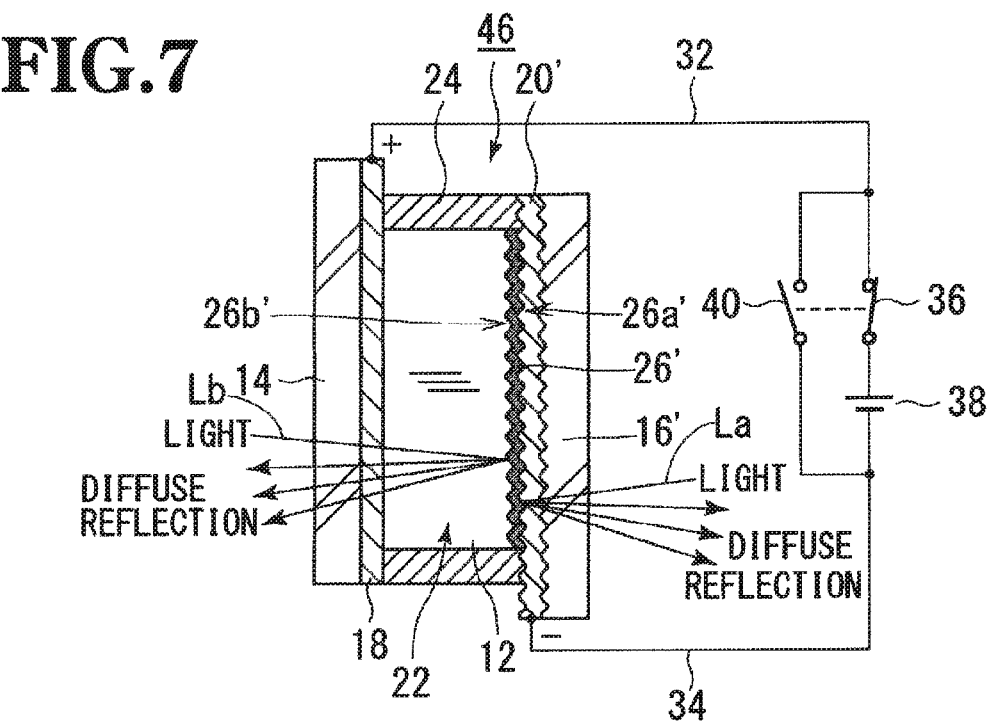
FIG. 7 is a diagram illustrating a state in which a voltage is applied between electrodes in the reflectance variable element in FIG. 6.

When the state in FIG. 6 is switched to a state in which a voltage is applied between the transparent conductive films 18, 20' in FIG. 7, metal cations $Ag^+$ and $Cu^{2+}$ in the electrolytic solution 22 move to a surface of the negative electrode 20' and are reduced. As a result, a deposited layer (diffuse reflective layer) 26' containing silver as a main component, with a small amount of copper mixed therein as an accessory component, is deposited on the surface of the negative electrode 20', whereby a reflective surface (diffuse reflective surface) 26a' provided by the deposited layer 26' appears. Consequently, the diffuse reflection/transmission-type element 46 has an increased reflectance (reflectance provided mainly by diffusive reflection) and a decreased transmittance. Light La entering the diffuse reflection/transmission-type element 46 is diffused and reflected by the reflective surface 26a'. The voltage applied between the transparent conductive films 18, 20' can be made variable in a stepwise or stepless manner, enabling stepwise or stepless adjustment of the reflectance and the transmittance. Or, the voltage applied between the transparent conductive films 18, 20' is made to be a voltage obtained by subjecting a direct-current voltage (direct-current voltage having a magnitude providing a desired highest reflectance or a desired lowest transmittance) to pulse width modulation and a duty cycle of pulses resulting from the pulse width modulation is made to be variable in a stepwise or stepless manner, enabling stepwise or stepless adjustment of the reflectance and the transmittance. The diffuse reflection/transmission-type element 46 can be used as an element that diffuses and reflects light La entering from the riGht side (transparent substrate 16' side) of the diffuse reflection/transmission-type element 46 in FIG. 7, by means of the reflective surface 26a', which is a surface of the deposited layer 26' viewed from the right side. Additionally, the diffuse reflection/transmission-type element 46 can be used as an element that diffuses and reflects light Lb entering from the left side (transparent substrate 14 side) of the diffuse reflection/transmission-type element 46, by means of a reflective surface 26b', which is a surface of the deposited layer 26' viewed from the left side. Furthermore, the diffuse reflection/transmission-type element 46 can be used as an element that diffuses and reflects light entering from both the right and left sides of the diffuse reflection/transmission-type element 46, by means of the right and left reflective surfaces 26a' and 26b'.

When the transparent conductive films 18, 20' in FIG. 6 are short-circuited again from the state in FIG. 7, silver and copper forming the deposited layer 26 are oxidized and desorhed from the surface of the negative electrode 20, and turn into metal cations $Ag^+$ and $Cu^{2+}$, which are then dispersed in the electrolytic solution 22 again. As a result, the diffuse reflection/transmission-type element 46 has a lowered reflectance and an increased transmittance, and returns to the original state in which sight on the opposite side viewed through the diffuse reflection/transmission-type element 46 is obscure. Instead of the short-circuiting of the electrodes 18, 20', the electrodes 18, 20' can be opened. In other words, if the electrodes 18, 20' are opened, an electric field between the electrodes 18, 20' disappears, enabling metal cations $Ag^+$ and $Cu^{2+}$ to be desorbed from the negative electrode 20' and the diffuse reflection/transmission-type element 46 to return to the original state. In other words, when the switches 36, 40 are both turned off from the state in FIG. 7 to open the electrodes 18, 20', the reflectance is lowered and the transmittance is increased at a sedate rate compared to the case where the electrodes 18, 20' are short-circuited, and the diffuse reflection/transmission-type element 46 thereby returns to the original state.

According to the above, the reflectance and the transmittance of the diffuse reflection/transmission-type element 46 can reversibly be varied by applying an electric field between the electrodes 18, 20' and cancelling the application of the electric field.

The diffuse reflection/transmission-type element 46 is favorable for use as, for example, a light control glass window for a building. In other words, while blocking sight lines from the outside of a room, in summer, the transmittance is lowered (reflectance is raised) to reflect ultraviolet light and infrared light, enabling enhancement in room cooling efficiency, and in winter, the transmittance is raised (reflectance is lowered), enabling enhancement in room heating efficiency. As a result, an energy saving effect can be obtained.

Although silver nitrate is used in each of the above embodiments, silver halide such as AgI or AgCl may be used instead of silver nitrate. Also, although cupric chloride is used in each of the above embodiments, instead of cupric chloride, another copper halide such as CuF, CuCl or CuBr may be used. Also, although LiBr is used as a supporting electrolyte in each of the above embodiments, instead of LiBr, e.g., an ammonium salt may be used.

Although propylene carbonate is used as a main component of a non-aqueous solvent in each of the above embodiments, instead of propylene carbonate, γ-butyrolactone can be used. Where γ-butyrolactone is used, a reflectance variable element having a high cold tolerance may be able to be obtained as in the case where propylene carbonate is used.

Although, e.g., a glass substrate or a resin substrate is used as a base material for forming the transparent conductive films 18, 20 in each of the above embodiments, it is possible that a resin film is used as a base material and a conductive film is formed on a surface of the resin film.

Although the reflectance is lowered by short-circuiting or opening the electrodes in each of the above embodiments, as with the elements described in Patent Literature 1 and Non Patent Literature 1, the reflectance can be lowered by applying a reverse voltage between the electrodes.

Although in the fabrication procedure described in the example of Embodiment 1 above, an electrolytic solution is prepared by mixing a propylene carbonate solution with a supporting electrolyte (LiBr) dissolved therein, a silver nitrate-methanol solution and a copper chloride-methanol solution, a method for preparing an electrolytic solution is not limited to this method. In other words, instead of this method, an electrolytic solution can be prepared by mixing a propylene carbonate solution before dissolving a supporting electrolyte (LiBr) therein, a silver nitrate-methanol solution and a copper chloride-methanol solution and subsequently dissolving a supporting electrolyte (LiBr) in the mixture solution.

Although the conductive film 18 is formed by a transparent conductive film in Embodiment 2 above, a metal film (non-transparent conductive film) can be used. Also, although one obtained by forming a transparent conductive film 18 on a surface of a non-transparent substrate 44 is used in Embodiment 2 above, instead of the combination of the non-transparent substrate 44 and the transparent conductive film 18, it is possible that a metal plate single body is disposed and the metal plate single body is used as both a substrate and an electrode.

Also, although the element returns from the state in which the deposited layer 26, 26', is deposited to the state in which the deposited layer 26, 26' has completely disappeared in the above embodiments, usage of the element in a state in which the element is prevented from returning to the state in which the deposited layer 26, 26' has completely disappeared (the element is left in a state in which the deposited layer 26, 26' slightly remains) is possible.

The invention claimed is:

1. A reflectance variable element comprising paired electrodes disposed across a gap, and an electrolytic solution charged in the gap, wherein:
the electrolytic solution has a composition in which at least silver ions and copper ions, a content by weight of the copper ions being smaller than that of the silver ions, are contained in a solvent that is a non-aqueous solvent, the solvent containing a non-aqueous solvent having a boiling point that is higher than that of methanol and methanol, a content by weight of the methanol being smaller than that of the non-aqueous solvent; and
according to variation of an electric field between the paired electrodes, the element transitions between a state in which silver ions and copper ions in the electrolytic solution move to a surface of one of the electrodes, silver and copper are deposited on the surface of the electrode and a reflectance of the surface of the electrode is thereby increased and a state in which the silver and the copper are desorbed from the surface of the electrode and the reflectance of the surface of the electrode is thereby decreased, whereby the reflectance of the surface of the electrode is reversibly varied.

2. The element according to claim 1, wherein the silver ions are ones derived from silver nitrate.

3. The element according to claim 1, wherein the copper ions are ones derived from copper chloride.

4. The element according to claim 1, wherein the reflective surface formed by the deposition of the silver and the copper forms a specular surface.

5. The element according to claim 1, wherein the paired electrodes include respective transparent conductive films disposed on respective surfaces of two transparent substrates disposed so as to face each other across the gap, the surfaces facing each other, and the element forms a light control filter for a camera.

6. The element according to claim 1, wherein the non-aqueous solvent having a boiling point that is higher than that of methanol contains at least one selected from propylene carbonate and γ-butyrolactone as a component whose content by weight is highest.

7. The element according to claim 1, wherein a distance of the gap is no less than 100 μm and no more than 1 mm.

8. The element according to claim 1, wherein a polymer is added in the electrolytic solution.

9. A method for manufacturing a reflectance variable element, the method comprising: an electrolytic solution preparation step of preparing an electrolytic solution, the step including the steps of preparing silver salt-methanol solution by dissolving a metal salt of silver in methanol, preparing a copper metal salt-methanol solution by dissolving a metal salt of copper in methanol, mixing the silver salt-methanol solution and the copper metal salt-methanol solution into a non-aqueous solvent having a boiling point that is higher than that of methanol, weight of the non-aqueous solvent being larger than that of a total of the silver salt-methanol solution and the copper metal salt-methanol solution, and dissolving a supporting electrolyte in the non-aqueous solvent before or after mixing the silver salt-methanol solution and the copper metal salt-methanol solution into the non-aqueous solvent; and a charging step of charging the prepared electrolytic solution into a gap between paired electrodes, wherein according to variation of an electric field between the paired electrodes, the element transitions between a state in which silver ions and copper ions in the electrolytic solution move to a surface of one of the electrodes, silver and copper are deposited on the surface of the electrode and a reflectance of the surface of the electrode is thereby increased and a state in which the silver and the copper are desorbed from the surface of the electrode and the reflectance of the surface of the electrode is thereby decreased, whereby the reflectance of the surface of the electrode is reversibly varied.

10. The method according to claim 9, wherein the metal salt of silver is silver nitrate.

* * * * *